Patented Jan. 29, 1946

2,393,913

UNITED STATES PATENT OFFICE 2,393,913

PRODUCTION OF RESIN FROM ACID-REFINING RESIDUE

Wilbert Adrian King, North Haven, and Julius Kleiner, Wallingford, Conn., and John Randolph Clark, Nutley, N. J., assignors to Allied Chemical & Dye Corporation, New York, N. Y., a corporation of New York No Drawing. Application May 6, 1943, Serial No. 485,870

3 Claims. (Cl. 196—40)

This invention relates to the production of a useful resin from acid-refining residue.

It is common to treat xylenes and similar oils obtained from drip oil, coke-oven operations, petroleum cracking and reforming operations, and the like with sulfuric acid to polymerize resinogenic or gum-forming constituents, present in relatively small amount in these oils, in order to produce refined solvents from the oils. After acid treatment and removal of the acid sludge, the oil is generally neutralized by washing with alkali, and after removal of the alkaline wash liquor, is subjected to distillation to recover the refined solvent, leaving in the still a residue of polymerized gum-forming and resinogenic constituents.

These residues are generally brittle, pitch-like materials which are of little value and have found only limited industrial use. In order to obtain more useful products, it has been proposed to subject these residues to distillation whereby heavy oils have been obtained as distillate, which oils have also found limited industrial use.

It is an object of this invention to provide a process for treating acid-refining residue to recover therefrom light-colored, soft resins of high quality.

We have discovered that low-melting resins of light color and high quality may be recovered from acid-refining residue by treating the residue to remove therefrom all or most of the inorganic material and thereafter subjecting the refined residue to distillation, preferably under reduced pressure, until low-melting resins are obtained as distillate cuts. We have made the surprising discovery that the removal of the inorganic constituents of the still residue results in the production of high-quality resins as distillate upon the subsequent distillation of the thus treated still residue, whereas when the still residue is subjected to distillation without removing the inorganic constituents it has not been found possible to obtain a distillate fraction which is a resin as in the process of our invention.

The residues to which the process of this application is applicable are the still residues obtained as above described when crude solvent oils consisting primarily of aromatic hydrocarbons having boiling points not higher than about 150° C., e. g., toluene, xylenes and other benzene homologs having boiling points not higher than about 150° C., particularly mixtures of such crude aromatic hydrocarbons distilled from drip oils, tars such as coal tar, carburetted water-gas tar or oil-gas tar, from the product of petroleum cracking and reforming, or from the light oils washed out of coke oven gas, carburetted water gas, oil gas, or the like, are treated with sulfuric acid to polymerize gum-forming and resinogenic constituents, such as styrene and cyclopentadiene, and are then neutralized and distilled to separate a refined solvent oil as distillate. Residues thus obtained are herein referred to as acid-refining residues. In the production of such residues, after sulfuric acid treatment the acid sludge which separates as a layer separate from the oil is generally removed before neutralization and distillation of the oil. However, in some cases where the amount of gum-forming material and therefore the amount of acid employed is small this sludge-removal step is unnecessary. Similarly, the alkali used for neutralization is generally separated from the oil, but may in some instances remain. Thus, the residue left in the still upon subsequent distillation to separate a refined solvent as distillate may, in some cases, contain all the acid and alkali reagents employed in the treatment of the solvent. Usually, however, the aqueous sludges and wash liquors are removed after each treating step, and the still residue contains only a part of the inorganic treating agents usually in the form of metal sulfates and sulfonates which remain dissolved, or in part dissolved and in part dispersed, in the oil after the various treating steps. The process of our invention which involves the removal of inorganic constituents before distillation to recover low-melting resins is applicable to the still residues obtained from either of the refining operations above described.

The inorganic constituents present in the still residue may include sulfates and sulfonates of sodium, calcium, or other metal, depending on the alkali used for neutralization. Caustic soda and lime are the alkalies commonly used for the neutralization of acid-treated solvent oils, and sodium sulfate, sodium sulfonates, calcium sulfate and calcium sulfonates are accordingly the inorganic constituents more commonly found in the acid-refining residues to which the process of our invention is applicable.

As above pointed out, the crude aromatic hydrocarbon oils to which the process of our invention is applicable include hydrocarbon oil fractions consisting primarily of hydrocarbons having boiling points not higher than about 150° C.; such fractions are generally recovered from coke-oven distillates, gas condensates such as drip oils and light oils, tar distillates, and cracked and reformed petroleum, as fractions having boiling end-points not higher than about 150° C. The solvent fractions generally taken from these sources include a benzene-toluene fraction, a mixed xylene fraction, and the so-called "solvent" fraction—a mixture of benzene homologs of boiling range about 120°–150° C. In some cases, fractions of this type contain a sufficiently high proportion of a resinogenic material such as styrene to make it profitable to carry out elaborate refining operations and work up the crude for recovery of a resin, such as polystyrene, as a still residue product. In most cases, the content of resinogenic material is relatively low and the primary product to be recovered is a solvent oil. Acid refining is carried out in this case to eliminate the relatively small amounts of gum-forming and resinogenic material by polymerization followed subsequently by distillation for separation of a refined solvent as distillate. In this case, as above pointed out, the still residue is a pitch-like material of limited usefulness which contains a substantial proportion of inorganic material.

In carrying out the process of our invention, the method used for removal of inorganic constituents from the acid-refining residue depends upon the type of inorganic constituents present. For example, when caustic soda has been used in the neutralization step and the inorganic constituents are thus sodium salts, they may be effectively removed by repeated washing of the residue with water. In order to wash the residue effectively, we have found it advantageous to dissolve it in a solvent such as toluene and to agitate this residue solution with successive portions of water until inorganic constituents have been substantially removed. The residual solution may be further treated with activated clay in order to effect substantially complete clarification of the oil.

In many other cases, for example, when lime has been employed as a neutralizing agent, we have found it advantageous to extract the residue, preferably in the form of a solution, with aqueous sulfuric acid, preferably dilute. Contrary to normal expectations, a sharp separation of inorganic constituents such as calcium sulfate and sulfonates is obtained by sulfuric acid extraction. The raffinate from the sulfuric acid extraction is thereafter preferably neutralized and washed with water.

After removal of the inorganic constituents, the solvent, if such has been employed, is removed by distillation and the residue is subjected to distillation, preferably under high vacuum. The first fractions taken off during the distillation under high vacuum are generally oils ranging from light oils constituted of residual solvent material to heavy oils containing substantial amounts of the dimeric and other of the lower polymeric forms of the resinogenic materials originally present. As distillation is continued further, we have surprisingly found that distillate fractions may be obtained which consist of low-melting resins, i. e. resins of melting points 0° C. or above. Such resins, we have found, cannot be obtained as distillate fractions, except after the removal of inorganic constituents from the residue, as above described. We have found that, with the process of our invention involving preliminary removal of inorganic constituents from acid-refining residue, resins melting as high as 60° C. may be obtained as distillate fractions.

The distillate fractions thus obtained from acid-refining residue by the process of our invention are products of considerable industrial importance. The heavy oils taken as distillate fractions before the low-melting resins are useful as plasticizers. The later low-melting resin fractions have been found particularly useful as ingredients of adhesives and as softeners in rubber compounding.

The following examples are illustrative of the process of our invention:

Example 1

Samples of (1) coke-oven light-oil crude still residue, (2) refined still residue untreated, and (3) refined still residue with sulfonates removed were employed. These materials were obtained as follows:

*Sample 1.*—Coke oven light oil, a light coke-oven distillate of boiling range 70° to 220° C., was distilled to separate crude solvent fractions as distillate. The still residue, which was not an acid-refining residue and therefore did not contain acid-refining sulfates and sulfonates, was the origin of Sample 1 above.

*Sample 2.*—The residue from which this sample was taken was recovered upon distillation of light-oil fractions, refined by conventional sulfuric acid treatment and lime neutralization. The distillation residue was thus an acid-refining residue. It was not treated for removal of sulfates and sulfonates.

*Sample 3.*—To obtain this sample (the refined still residue with inorganic constituents removed), 1409 parts by weight of the material of Sample 2 was dissolved in 1022 parts of toluene. The solution was washed twice by agitation with 10% by volume of 20% sulfuric acid, was then neutralized with a 20% aqueous sodium hydroxide solution and washed with water. Toluene was removed by simple distillation. The still residue (the origin of Sample 3) was thus an acid-refining residue from which sulfates and sulfonates had been removed by dilute sulfuric acid wash.

1932 parts by weight of Sample 1, a material having a specific gravity of .996 at 15.5° C. and color C–11, was subjected to simple vacuum distillation at 6 mm. absolute pressure. Nine distillate cuts were taken, but none of these were low-melting resins, i. e. no material of melting point above 0° C. could be isolated by distillation.

1638 grams of Sample 2, a material having a specific gravity of 1.078 at 15.5° C. and of dark-brown color, was subjected to simple vacuum distillation at 6 mm. absolute pressure. The distillation was discontinued when decomposition took place. The residue was a polymeric mass containing considerable amounts of inorganic material. As in the case of Sample 1 above, no material of melting point above 0° C. was obtained by distillation before decomposition took place.

1059 parts by weight of Sample 3 was subjected to simple vacuum distillation at 6 mm. absolute pressure. Cuts were taken as follows:

| Cut | Parts by weight | Percent of charge | Percent of original residue | Boiling range, 0° C. | Specific gravity at 15.5° C. | M. P., °C. | Color |
|---|---|---|---|---|---|---|---|
| 1 | 189 | 17.9 | 13.4 | 127-297 | 0.969 | | |
| 2 | 194 | 18.3 | 13.7 | 267-278 | 0.993 | | |
| 3 | 189 | 17.9 | 13.4 | 285-320 | 0.995 | | |
| 4 | 145 | 13.7 | 10.3 | 296-376 | 1.009 | | |
| 5 | 100 | 9.4 | 7.1 | (1) | | 4.5 | C½ |
| 6 | 83 | 7.8 | 5.9 | (1) | | 17.0 | C2½ |
| Residue | 86 | 7.8 | 5.6 | | | | |
| Total recovery | 1,014 | 95.5 | 71.5 | | | | |

[1] Decomposition.

The still residue was a pitch-like material containing considerable amounts of free carbon and a small amount of inorganic material. Of the fractions obtained in this distillation, cuts 2, 3, and 4 were heavy oils useful as plasticizers, while cuts 5 and 6 were low-melting resins useful as ingredients of adhesives or as softeners in rubber compounding.

Example 2

Solvent-refining residue was obtained as still residue by subjecting a crude solvent naphtha fraction of boiling range 125° to 150° C. to a sulfuric acid wash, neutralizing with caustic soda solution after removal of acid sludge, and distilling. 2139 parts by weight of this residue was diluted with 3500 parts by weight of toluene and the resulting solution was agitated for 1¼ hours with 1000 parts by weight of water. The water was allowed to settle and was siphoned off. Another 1000 parts by weight of water was added to the mixture, agitated for ½ hour, allowed to settle, and the water layer siphoned off as before. This procedure was repeated twice more. The toluene layer was finally dried by distilling off some of the toluene. 2339 parts by weight of the resulting residue-toluene solution was agitated for three hours with 117 grams of fuller's earth (5% by weight). The material was allowed to settle and was then filtered. The toluene was removed by distillation and a still residue was recovered amounting to 882 parts by weight. The material was vacuum distilled under an absolute pressure of 6 mm. and seven cuts were taken as follows:

| | Cut | | | | | | |
|---|---|---|---|---|---|---|---|
| | 1 | 2 | 3 | 4 | 5 | 6 | 7 |
| Grams in cut | 88 | 90.5 | 87 | 78 | 90 | 86.5 | 75 |
| Wt. per cent of charge | 10 | 10.3 | 9.9 | 8.9 | 10.2 | 9.8 | 8.5 |
| Sp. gr. at 15.5° C | 0.980 | 0.986 | 0.991 | 0.995 | 1.021 | 1.039 | 1.022 |
| Boiling range: | | | | | | | |
| Start | 128 | 168 | 260 | 157 | 160 | 165 | 150 |
| 90 per cent | 301 | 312 | 326 | 374 | 376 | (1) | 368 |
| Dry | 309 | (1) | (1) | (1) | (1) | (1) | (1) |
| M. P., °C | | | | | -8 | 1.5 | -8 |

[1] Decomposition.

The C-scale for resin color referred to above is determined by mixing three stock solutions, water and standard color number solutions, in the proportions indicated in the following table, thereby obtaining the colors indicated in this table; namely, stock solution "A" consisting of 40 cc. of 33.5% hydrochloric acid and 1560 cc. of water; stock solution "B" made by triturating 450 grams of C. P. ferric chloride (FeCl₃.6H₂O), 270 cc. of solution "A" and filtering, using the clear filtrate for stock solution "B"; and stock solution "C" made by triturating 60 grams of C. P. cobalt chloride (CoCl₂.6H₂O) and 60 cc. of solution "A" and filtering, using the filtrate for stock solution "C."

| Standard "C" series—Color No. | Volumes in cubic centimeters | | | | Standard color No. solution |
|---|---|---|---|---|---|
| | A | B | C | Water | |
| C-⅛ | 18 | | | | 6 of #½. |
| C-¼ | 12 | | | | 12 of #½. |
| C-⅜ | 6 | | | | 18 of #½. |
| C-½ | 125 | 0.5 | 0.50 | | |
| C-¾ | 125 | | | | 12 of #½+12 of #1. |
| C-1 | 125 | 1.0 | 0.75 | | |
| C-1¼ | 125 | | | | 12 of #1+12 of #1¼. |
| C-1½ | 125 | 1.4 | 0.95 | | |
| C-2 | 125 | 2.0 | 1.25 | | |
| C-2½ | 125 | 2.8 | 1.60 | | |
| C-3 | 125 | 4.0 | 2.00 | | |
| C-3½ | 15 | 6.0 | 2.00 | 110 | |
| C-4 | 15 | 8.0 | 2.00 | 110 | |
| C-5 | 15 | 10.0 | 2.75 | 85 | |
| C-6 | 10 | 20.0 | 5.00 | 90 | |
| C-7 | | 40.0 | 7.50 | 100 | |
| C-8 | | 65.0 | 5.00 | 50 | |
| C-9 | | 125.0 | 10.00 | 27.5 | |
| C-10 | | 125.0 | 10.00 | | |

The solutions should be mixed well and about 25-28 cc. of each of the above-indicated mixture placed in a 1-ounce test bottle, each bottle labeled with its number, and the bottle sealed with sealing wax to prevent evaporation of water and HCl.

To determine the color of a resin, a 2-gram sample thereof is dissolved in 25 cc. of benzene and the depth of the color of the resin solution thus produced is compared with the standard colors. If the sample lies between two consecutive numbers, its color is reported as the higher one.

Since certain changes may be made in carrying out the above process without departing from the scope of the invention, it is intended that all matter contained in the above description shall be interpreted as illustrative and not in a limiting sense.

We claim:

1. A process which comprises treating a crude aromatic hydrocarbon oil containing gum-forming constituents and having a boiling end point not higher than about 150° C. with sulfuric acid to polymerize such gum-forming constituents, neutralizing acidic bodies remaining in said oil after the acid treatment, distilling to produce a refined solvent as distillate and a resinous material as still residue, subjecting said residue to extraction with a solvent selected from the group consisting of water and dilute sulfuric acid to remove therefrom inorganic constituents and distilling the residue from which inorganic constituents have been removed for a period of time sufficient to produce as distillate fraction a resinous material melting above 0° C.

2. A process which comprises treating a crude aromatic hydrocarbon oil containing gum-forming constituents and having a boiling end point not higher than about 150° C. with sulfuric acid to polymerize such gum-forming constituents, treating the oil with lime to neutralize acidic bodies remaining in said oil after the acid treatment, distilling to produce a refined solvent as distillate and a resinous material containing calcium compounds as still residue, subjecting a solution of said residue to extraction with dilute sulfuric acid to remove therefrom the bulk of the calcium constituents, and subjecting the residue from which inorganic constituents have been removed to distillation under reduced pressure to produce as distillate fraction a resinous material melting above 0° C.

3. A process which comprises treating a crude aromatic hydrocarbon oil containing gum-forming constituents and having a boiling end point not higher than about 150° C. with sulfuric acid to polymerize such gum-forming constituents, separating the treated oil from the acid sludge, treating the oil with a caustic soda solution to neutralize acidic bodies remaining in said oil after the acid treatment, separating the treated oil from the alkaline wash solution, distilling the oil to produce a refined solvent as distillate and a resinous material containing sodium compounds as still residue, subjecting a solution of said residue to extraction with water to remove therefrom the bulk of the sodium constituents, and subjecting the residue from which inorganic constituents have been removed to distillation under reduced pressure to produce as distillate fraction a resinous material melting above 0° C.

WILBERT ADRIAN KING.
JULIUS KLEINER.
JOHN RANDOLPH CLARK.